(No Model.)  2 Sheets—Sheet 1.

W. WIMPEE & J. C. PRINTUP.
COTTON CLEANER.

No. 283,733.  Patented Aug. 21, 1883.

WITNESSES
Wm A. Skinkle
H. W. Elmore

INVENTORS
William Wimpee
John C. Printup
By their Attorneys,
Baldwin, Hopkins & Peyton.

N. PETERS. Photo-Lithographer, Washington, D. C.

(No Model.) 2 Sheets—Sheet 2.

W. WIMPEE & J. C. PRINTUP.
COTTON CLEANER.

No. 283,733. Patented Aug. 21, 1883.

WITNESSES
Wm A. Skinkle
H. W. Elmore

INVENTORS
William Wimpee.
John C. Printup.
By their Attorneys.
Baldwin, Hopkins & Peyton.

UNITED STATES PATENT OFFICE.

WILLIAM WIMPEE AND JOHN C. PRINTUP, OF ROME, GEORGIA.

COTTON-CLEANER.

SPECIFICATION forming part of Letters Patent No. 283,733, dated August 21, 1883.

Application filed May 5, 1883. (No model.)

*To all whom it may concern:*

Be it known that we, WILLIAM WIMPEE and JOHN C. PRINTUP, both of Rome, in the county of Floyd and State of Georgia, have invented certain new and useful Improvements in Cotton-Cleaners, of which the following is a specification.

Our invention consists in certain improvements in apparatus for separating dust and other impurities from seed-cotton previous to its delivery to the gin.

Figure 1:
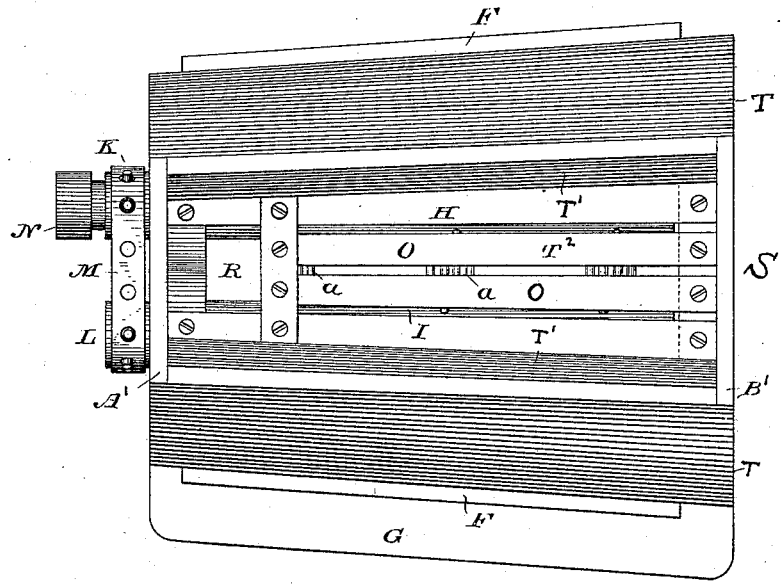
Figure 2:
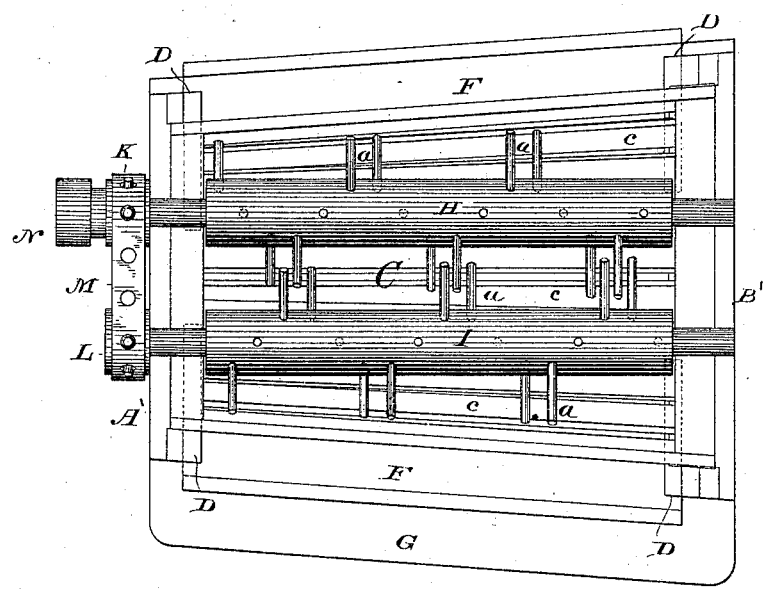
Figure 3:
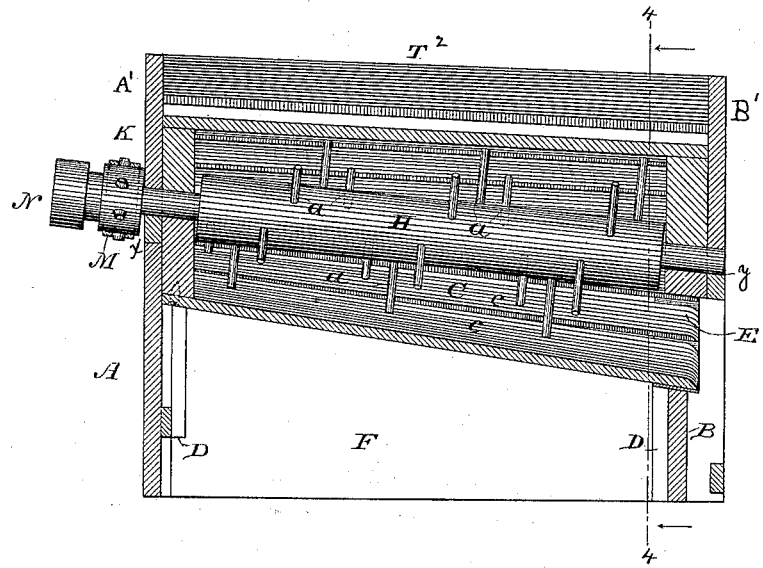
Figure 4:
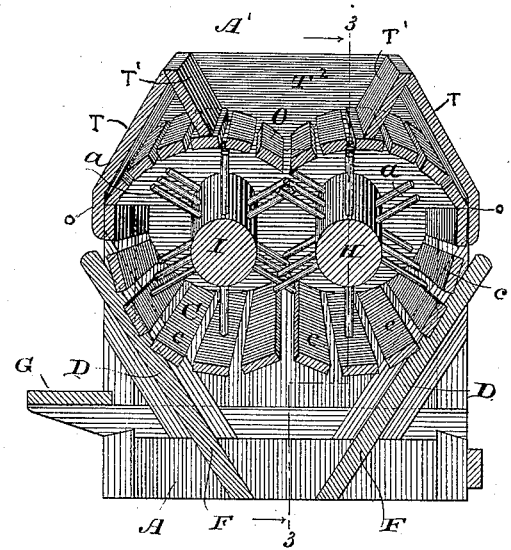

In the accompanying drawings, Figure 1 is a plan view of our improved apparatus; Fig. 2, a similar view with the top removed; Fig. 3, a view partly in section on the line 3 3 of Fig. 4, looking in the direction of the arrows; and Fig. 4, a cross-section taken on the line 4 4 of Fig. 3, looking in the direction of the arrows.

A series of slats or bars, $c$, are arranged between the end pieces, A B A' B', so as to form a horizontal slatted chamber, C, which inclines downward and increases in size from A to B. The chamber in cross-section is enlarged at both sides, preferably on extended arches of a circle, the two arches springing from the middle of the upper side and meeting again at the middle of the under side of the chamber. The end pieces, A' and B', rest on the pieces A and B on the lines $x$ and $y$.

Two shafts, H and I, provided with spikes or teeth $a$, arranged spirally, as shown, are mounted within the chamber C, in bearings in the ends A and B, and are so placed with reference to each other that the teeth of one shaft intermesh with those of the other, so that as the shafts revolve each tooth of one shaft will, in each revolution, come in contact with a corresponding tooth in the other shaft, the two sliding past each other and effectually disengaging any cotton that may tend to adhere or become entangled on the teeth. The shafts are inclined in lines parallel with the bottom of the chamber, and are provided with pulleys K and L, which are connected by a band or chain, M, and are revolved by a drive-pulley, N.

The end pieces, A and B, are provided with grooves or guides D, in which the inclined sides F are free to slide up and down. A step or platform, G, is attached to the apparatus, on which the attendant may stand when feeding the cotton. The end piece, B, is provided with an opening, E, through which the cleaned cotton is delivered.

The upper part or section of the double chamber C is composed of the slatted cover O, which joins the lower part or section at the point $o$, and which may be lifted off. The cover O is provided at one end with an opening, R, through which the cotton is fed. An outside covering or roof, composed of the end pieces, A' B', the sides T, and the inner slanting sides, T', all of which are firmly united together, fits down over the slatted covering O, and, with the sliding sides F, forms an inclosure for the double chamber C. The top of the chamber is, however, preferably left exposed, and forms the bottom of a hopper or trough, $T^2$, which contains the cotton to be fed through the opening R into the double chamber C. The slatted cover O, which forms the bottom of the trough, permits a portion of the dust and trash to fall through the chamber C into the receptacle below, and also permits a free circulation of air through the chamber. The cotton is taken up by the toothed shafts and thoroughly beaten and torn apart and separated from dust and other foreign matter and delivered in a proper condition for ginning through the opening E. The dust and trash fall through the openings between the slats and accumulate between the sliding sides, and may be readily removed when the sides are elevated.

Our improvements are especially designed for cleaning cotton, but they may also be employed in cleaning wool and other like substances.

We are aware that inclined double chambers with shafts provided with spirally-arranged teeth mounted in said chambers between which the cotton is fed are old, and we do not claim such subject-matter, but limit ourselves to our improved organization.

We claim as our invention—

1. The herein-described cotton-cleaner, comprising the slatted chamber, the toothed shafts mounted therein, the trash-receptacle below the slatted chamber formed of the end pieces, A and B, and the sliding sides F, substantially as described.

2. The herein-described cotton-cleaner, composed of the slatted chamber, the toothed shafts located therein, the trough or receptacle above the chamber, the step or platform, and the sliding sides, substantially as described.

3. The herein-described cotton-cleaner, comprising the frame, the slatted chamber, and the removable slatted cover O, which constitutes the top of the chamber, and also a slatted bottom for the hopper or feed-trough, which contains the cotton, substantially as set forth.

4. The herein-described cotton-cleaner, comprising the frame, the slatted chamber, the removable cover O, and the trough $T^2$, composed of the slatted cover O, (which forms the bottom of the trough,) the end pieces, A' B', and the sides T', substantially as described.

In testimony whereof we have hereunto subscribed our names this 1st day of May, A. D. 1883.

WILLIAM WIMPEE.
     JOHN C. PRINTUP.

Witnesses:
 GEO. C. BEYSIEGEL,
 LOUIS MEYERHARDT.